(12) United States Patent  
Ishikawa

(10) Patent No.: US 8,158,297 B2
(45) Date of Patent: Apr. 17, 2012

(54) FUEL CELL SYSTEM WITH A DEFECT DETECTION DEVICE FOR DISCHARGE VALVE

(75) Inventor: Norimasa Ishikawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 451 days.

(21) Appl. No.: 12/444,803

(22) PCT Filed: Oct. 16, 2007

(86) PCT No.: PCT/JP2007/070512
§ 371 (c)(1),
(2), (4) Date: Apr. 8, 2009

(87) PCT Pub. No.: WO2008/053727
PCT Pub. Date: May 8, 2008

(65) Prior Publication Data
US 2010/0104905 A1 Apr. 29, 2010

(30) Foreign Application Priority Data
Oct. 31, 2006 (JP) ................................. 2006-296605

(51) Int. Cl.
*H01M 8/04* (2006.01)
(52) U.S. Cl. ....................................... 429/444; 429/415
(58) Field of Classification Search .................... 429/22
See application file for complete search history.

(56) References Cited

U.S. PATENT DOCUMENTS

| 6,864,003 | B2 * | 3/2005 | Ueda et al. ..................... 429/415 |
| 7,294,421 | B2 * | 11/2007 | Noetzel et al. ................ 429/446 |
| 7,413,823 | B2 * | 8/2008 | Illner et al. .................... 429/437 |
| 2006/0073363 | A1 * | 4/2006 | Taniguchi et al. .............. 429/12 |
| 2007/0218327 | A1 * | 9/2007 | Ishikawa et al. ................ 429/22 |

FOREIGN PATENT DOCUMENTS

| DE | 10-2004 005 446 A1 | 8/2005 |
| JP | 2003-092125 A | 3/2003 |
| JP | 2005-302563 A | 10/2005 |
| JP | 2005-302708 A | 10/2005 |
| JP | 2005-310550 A | 11/2005 |

* cited by examiner

*Primary Examiner* — Michael Zarroli
(74) *Attorney, Agent, or Firm* — Kenyon & Kenyon LLP

(57) ABSTRACT

The present invention is directed to a fuel cell system having fuel cells, a supply flow path for supplying a fuel gas from a fuel supply source to the fuel cells; a variable gas supply device for regulating a gas condition of the supply flow path; a first control device for driving and controlling the variable gas supply device; an off-gas flow path configured to release a fuel off-gas from the fuel cells to the outside through a discharge valve; a second control device for driving and controlling the discharge valve; and a defect detection device for detecting a defect of the discharge valve. By using a gas supply command amount for the variable gas supply device, the defect detection device detects a valve opening defect that the discharge valve does not return from an open state to a closed state.

5 Claims, 4 Drawing Sheets

FUEL CELL SYSTEM WITH A DEFECT DETECTION DEVICE FOR DISCHARGE VALVE

This is a 371 national phase application of PCT/JP2007/070512 filed 16 Oct. 2007, which claims priority to Japanese Patent Application No. 2006-296605 filed 31 Oct. 2006, the contents of which are incorporated herein by reference.

TECHNICAL FIELD

The present invention relates to a fuel cell system having, in an off-gas flow path, a discharge valve for discharging impurities generated by the power generation of a fuel cell.

BACKGROUND ART

Heretofore, a fuel cell system including a fuel cell for receiving the supply of a reactant gas (a fuel gas and an oxidizing gas) to generate a power has been suggested and put to practical use. Moreover, in recent years, a fuel cell system has been suggested in which a variable gas supply device such as a mechanical variable regulator or an injector is provided in a fuel supply flow path for allowing a fuel gas, which is supplied from a fuel supply source such as a hydrogen tank, to flow to the fuel cell, whereby the supply pressure of the fuel gas from the fuel supply source can be changed in accordance with the operation state of the system (e.g., see Japanese Patent Application Laid-Open No. 2005-302563).

DISCLOSURE OF THE INVENTION

In a fuel cell of a fuel cell system and a circulation flow path of a fuel off-gas, an impurity gas of nitrogen, carbon monoxide or the like, or a water content generated by power generation is accumulated with an elapse of time. Therefore, for a purpose of discharging the accumulated gas or water content from the system, a technology (a purge technology) is suggested in which a discharge valve such as a gas discharge valve or a water discharge valve is provided in a circulation flow path (or a discharge flow path connected to the circulation flow path), and the opening/closing of this discharge valve is controlled to discharge the gas or the water content.

However, in a state where the discharge valve is opened owing to, for example, foreign matters which bite into this discharge valve, even when the control is performed to close the valve, the valve remains open and cannot be closed, a so-called valve opening defect generated in this manner might cause a situation where a fuel to be circulated through the fuel cell is unnecessarily discharged, and hence the development of a technology for detecting the valve opening defect of the discharge valve during an operation is demanded.

The present invention has been developed in view of such a situation, and an object thereof is to provide a fuel cell system capable of detecting a valve opening defect of a discharge valve during the operation.

To achieve the object, a fuel cell system according to the present invention is a fuel cell system comprising: fuel cells; a supply flow path which allows a fuel gas, supplied from a fuel supply source, to flow to the fuel cells; a variable gas supply device which regulates a gas condition on the upstream side of the supply flow path to supply the regulated gas to the downstream side; a first control device which drives and controls the variable gas supply device; an off-gas flow path configured to release a fuel off-gas, discharged from the fuel cells, to the outside through a discharge valve; a second control device which drives and controls the discharge valve; and a defect detection device which detects a defect of the discharge valve, wherein by using a gas supply command amount for the variable gas supply device, the defect detection device detects a valve opening defect that the discharge valve does not return from an open state to a closed state.

According to such a constitution, since the valve opening defect of the discharge valve is detected by using the gas supply command amount for the variable gas supply device, the valve opening defect can be detected without any delay during the operation.

In the fuel cell system, the defect detection device may detect the valve opening defect of the discharge valve based on a gas supply amount increase amount $Qinc=Qreq-(Qfc+Qcl)$, in which $Qreq$ is the gas supply command amount based on a PI control rule for the variable gas supply device, $Qfc$ is a fuel gas consumption in the fuel cells, and $Qcl$ is a cross leak amount from an anode pole side to a cathode pole side in the fuel cells.

Moreover, in the fuel cell system, the defect detection device may detect the valve opening defect of the discharge valve in a case where a state in which the gas supply amount increase amount $Qinc$ exceeds a predetermined first threshold value continues for a predetermined time.

Furthermore, in the fuel cell system, the second control device may repeat opening/closing driving control for the discharge valve a plurality of times, when the defect detection device detects the valve opening defect of the discharge valve.

According to this constitution, when the valve opening defect of the discharge valve is detected during the operation, the valve opening defect can be released without stopping the operation.

Additionally, in the fuel cell system, the variable gas supply device may be an electromagnetic driving type opening/closing valve (e.g., an injector) in which a valve body is directly driven with an electromagnetic driving force for a predetermined driving period and detached from a valve seat. The discharge valve may similarly be an electromagnetic driving type opening/closing valve in which a valve body is directly driven with an electromagnetic driving force for a predetermined driving period and detached from a valve seat.

According to the present invention, the valve opening defect of the discharge valve can be detected during the operation.

BEST MODE FOR CARRYING OUT THE INVENTION

Hereinafter, a fuel cell system 1 according to an embodiment of the present invention will be described with reference to the drawings. In the present embodiment, an example in which the present invention is applied to a car-mounted power generation system of a fuel cell vehicle (a mobile body) will be described, but the fuel cell system according to the present invention may be mounted on any type of mobile body (a robot, a ship, an airplane or the like) in addition to the fuel cell vehicle. Moreover, the fuel cell system according to the present invention may be applied to a stationary power generation system for use as a power generation equipment for a construction (a housing, a building or the like).

First, a constitution of the fuel cell system 1 according to the embodiment of the present invention will be described with reference to FIG. 1.

Figure 1:
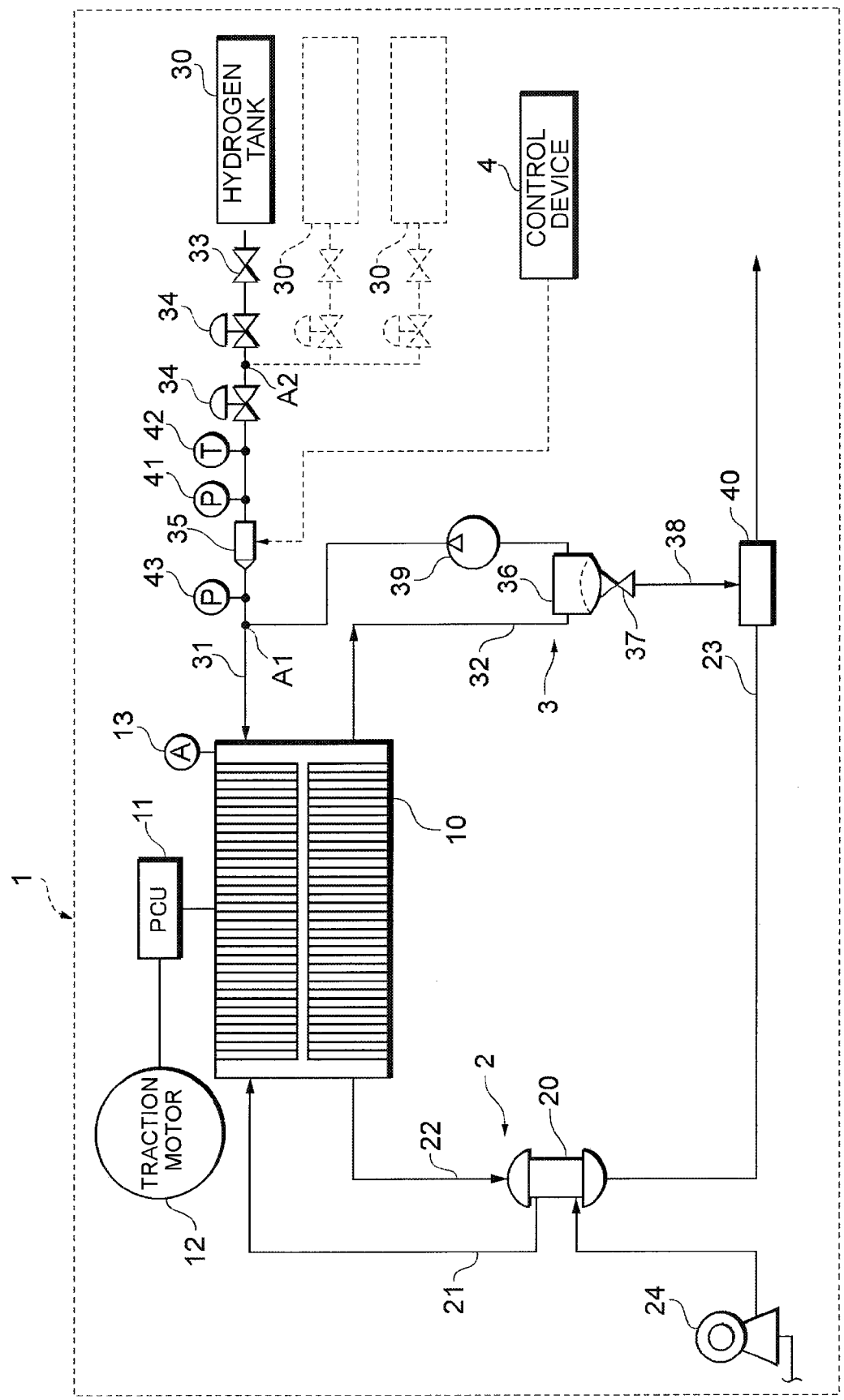
FIG. 1 is a constitution diagram of a fuel cell system according to an embodiment of the present invention.

As shown in FIG. 1, the fuel cell system 1 according to the present embodiment includes a fuel cell 10 which receives the supply of a reactant gas (an oxidizing gas and a fuel gas) to generate a power; an oxidizing gas piping system 2 which supplies air as the oxidizing gas to the fuel cell 10; a hydrogen gas piping system 3 which supplies a hydrogen gas as the fuel gas to the fuel cell 10; a control device (a first control device, a second control device and a defect detection device) 4 which generally controls the whole system and the like.

The fuel cell 10 has a stack structure in which the required number of unitary cells for receiving the supply of the reactant gas to generate a power by an electrochemical reaction are laminated. The power generated by the fuel cell 10 is supplied to a power control unit (PCU) 11. The PCU 11 includes an inverter, a DC-DC converter and the like arranged between the fuel cell 10 and a traction motor 12. Moreover, a current sensor 13 which detects a current during the power generation is attached to the fuel cell 10.

The oxidizing gas piping system 2 includes an air supply flow path 21 for supplying the oxidizing gas (air) humidified by a humidifier 20 to the fuel cell 10, an air discharge flow path 22 for guiding an oxidizing off-gas, which is discharged from the fuel cell 10, to the humidifier 20, and an exhaust flow path 23 for guiding the oxidizing off-gas from the humidifier 20 to the outside. The air supply flow path 21 is provided with a compressor 24 which takes the oxidizing gas from the atmosphere to feed the gas under pressure to the humidifier 20.

Moreover, the circulation flow path 32 is provided with a hydrogen pump 39 which pressurizes the hydrogen off-gas in the circulation flow path 32 to feed the gas to a hydrogen supply flow path 31 side. It is to be noted that the hydrogen off-gas discharged through the gas/water discharge valve 37 and the discharge flow path 38 is diluted by a diluter 40 to join the oxidizing off-gas in the gas discharge flow path 23.

The hydrogen gas piping system 3 includes a hydrogen tank 30 as a fuel supply source in which the hydrogen gas having a high pressure (e.g., 70 MPa) is received; a hydrogen supply flow path (a supply flow path) 31 as a fuel supply flow path for supplying the hydrogen gas from the hydrogen tank 30 to the fuel cell 10; and a circulation flow path (an off-gas flow path) 32 for returning a hydrogen off-gas, which is discharged from the fuel cell 10, to the hydrogen supply flow path 31.

It is to be noted that instead of the hydrogen tank 30, a reformer which forms a hydrogen-rich reformed gas from a hydrocarbon-based fuel, and a high-pressure gas tank which brings the reformed gas formed by this reformer into a high-pressure state to accumulate the pressure may be employed as fuel supply sources. Alternatively, a tank having a hydrogen occluded alloy may be employed as the fuel supply source.

The hydrogen supply flow path 31 is provided with a block valve 33 which blocks or allows the supply of the hydrogen gas from the hydrogen tank 30, a regulator 34 which regulates the pressure of the hydrogen gas, and an injector (a variable gas supply device) 35. Moreover, on the upstream side of the injector 35, a primary pressure sensor 41 and a temperature sensor 42 are provided to detect the pressure and temperature of the hydrogen gas in the hydrogen supply flow path 31.

Furthermore, on the downstream side of the injector 35 and on the upstream side of a joining part between the hydrogen supply flow path 31 and the circulation flow path 32, there are provided a secondary pressure sensor 43 which detects the pressure of the hydrogen gas in the hydrogen supply flow path 31 and a relief valve 44 opened in a case where the pressure in the hydrogen supply flow path 31 reaches a predetermined operation pressure.

The regulator 34 is a device which adjusts the upstream pressure (the primary pressure) to a preset secondary pressure. In the present embodiment, a mechanical pressure reduction valve which reduces the primary pressure is employed as the regulator 34. As the constitution of the mechanical pressure reduction valve, a known constitution may be employed which has a housing provided with a back pressure chamber and a pressure adjustment chamber formed via a diaphragm, and the primary pressure is reduced to a predetermined pressure by the back pressure of the back pressure chamber to form the secondary pressure in the pressure adjustment chamber.

The injector 35 is an electromagnetic driving type opening/closing valve in which a valve body is directly driven with an electromagnetic driving force for a predetermined driving period and detached from a valve seat, whereby a gas flow rate or a gas pressure can be regulated. The injector 35 includes the valve seat having jet holes which jet a gas fuel such as the hydrogen gas, and also includes a nozzle body which supplies and guides the gas fuel to the jet holes, and the valve body movably received and held in an axial direction (a gas flow direction) with respect to this nozzle body to open and close the jet holes.

In the present embodiment, the valve body of the injector 35 is driven by a solenoid which is an electromagnetic driving device, and a pulse-like excitation current supplied to this solenoid can be turned on or off to switch the opening area of each jet hole in two stages, multiple stages or a stepless manner.

It is to be noted that the valve body of the injector 35 is opened or closed to regulate the gas flow rate, and the pressure of the gas to be supplied to the downstream side of the injector 35 is decreased below the gas pressure on the upstream side of the injector 35, so that the injector 35 can be interpreted as a pressure adjustment valve (a pressure reduction valve, a regulator).

Moreover, in the present embodiment, the injector can be interpreted as a variable pressure adjustment valve capable of changing the adjustment amount (the reduction amount) of the upstream gas pressure of the injector 35 so that the pressure meets a demanded pressure for a predetermined pressure range based on a gas demand.

As described above, the injector 35 regulates a gas condition (the gas flow rate, a hydrogen mol concentration or the gas pressure) on the upstream side of the hydrogen supply flow path 31 to supply the gas to the downstream side, and the injector corresponds to the variable gas supply device according to the present invention.

It is to be noted that in the present embodiment, as shown in FIG. 1, the injector 35 is arranged on the upstream side of a joining part A1 between the hydrogen supply flow path 31 and the circulation flow path 32. Moreover, as shown by broken lines in FIG. 1, in a case where a plurality of hydrogen tanks 30 are employed as fuel supply sources, the injector 35 may be arranged on the downstream side of a part (a hydrogen gas joining part A2) where the hydrogen gases supplied from the hydrogen tanks 30 are joined.

The circulation flow path 32 is connected to a discharge flow path (an off-gas flow path) 38 via a gas-liquid separator 36 and a gas/water discharge valve (a discharge valve) 37. The gas-liquid separator 36 collects a water content from the hydrogen off-gas. The gas/water discharge valve 37 operates in accordance with a command from the control device 4 to discharge (purge), to the outside, the water content collected by the gas-liquid separator 36 and the hydrogen off-gas including impurities in the exhaust flow path 32.

Specifically, the gas/water discharge valve 37 is an electromagnetic driving type opening/closing valve in which a valve body is directly driven with an electromagnetic driving force in a predetermined driving period and detached from a valve seat. The valve body of the gas/water discharge valve 37 is driven by a solenoid which is an electromagnetic driving device, and a pulse-like excitation current supplied to this solenoid can be turned on or off to switch the opening area of a gas/water discharge port in two stages, multiple stages or a stepless manner.

Moreover, the circulation flow path 32 is provided with a hydrogen pump 39 which pressurizes the hydrogen off-gas in the circulation flow path 32 to feed the gas to a hydrogen supply flow path 31 side. It is to be noted that the hydrogen off-gas discharged through the gas/water discharge valve 37 and the discharge flow path 38 is diluted by a diluter 40 to join the oxidizing off-gas in the gas discharge flow path 32.

The control device 4 detects the operation amount of an acceleration operating device (an accelerator or the like) provided in the vehicle, and receives control information such as a demanded acceleration value (e.g., the demanded power generation amount from a load device such as the traction motor 12) to control the operations of various units in the system.

It is to be noted that the load device is a generic power consumption device including, in addition to the traction motor 12, an auxiliary device (e.g., the motor of the compressor 24, the hydrogen pump 39, a cooling pump or the like) required for operating the fuel cell 10, an actuator for use in any type of device (a change gear, a wheel control device, a steering device, a suspension device or the like) associated with the running of the vehicle, an air conditioning device (an air conditioner) of a passenger space, illumination, audio or the like.

The control device 4 is constituted of a computer system (not shown). Such a computer system includes a CPU, an ROM, an RAM, an HDD, an input/output interface, a display and the like, and the CPU reads any type of control program recorded in the ROM to execute desired calculation, to perform various processing and control such as feedback control or purge control described later.

Figure 2:
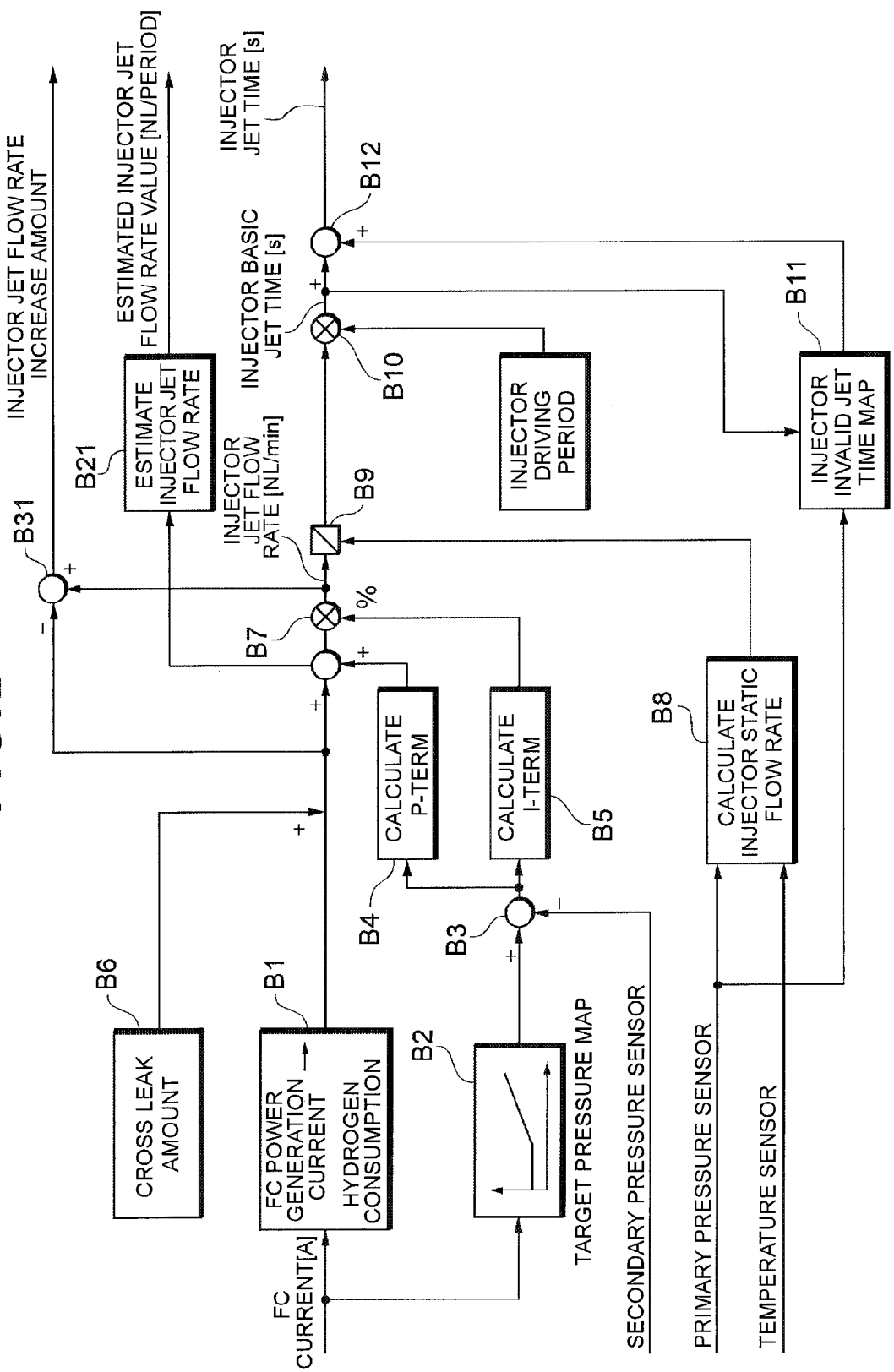
FIG. 2 is a control block diagram for explaining a control configuration of the fuel cell system shown in FIG. 1.

Specifically, as shown in FIG. 2, the control device 4 calculates the flow rate (hereinafter referred to as the "hydrogen consumption") of the hydrogen gas consumed by the fuel cell 10 based on a power generation current value of the fuel cell 10 detected by the current sensor 13 (a fuel consumption calculating function: B1). In the present embodiment, the hydrogen consumption is calculated and updated for each calculation period of the control device 4 by use of a specific calculation formula indicating a relation between the power generation current value and the hydrogen consumption.

Moreover, the control device 4 calculates a target pressure value of the hydrogen gas to be supplied to the fuel cell 10 in the downstream position of the injector 35 based on the power generation current value of the fuel cell 10 (a target pressure value calculating function: B2). In the present embodiment, the control device calculates the target pressure value for each calculation period of the control device 4 by using a specific map indicating a relation between the power generation current value and the target pressure value.

Furthermore, the control device 4 calculates a difference between the calculated target pressure value and the pressure value (the detected pressure value) of the downstream position of the injector 35 detected by the pressure sensor 43 (a pressure difference calculating function: B3). Then, to decrease the calculated difference, the control device 4 calculates a P-term (a proportional term) as a feedback correction flow rate (a P-term calculating function: B4) and calculates an I-term (an integral term) (an I-term calculating function: B5).

That is, in the present embodiment, the feedback correction flow rate is calculated using target follow-up type PI control. Then, the control device 4 adds the above P-term to a value obtained by adding up the hydrogen consumption and a cross leak amount generated in the fuel cell 10, and multiplies this added value by the above I-term to calculate the jet flow rate of the injector 35 (a jet flow rate calculating function: B7).

Here, the control device may calculate a feedforward correction flow rate corresponding to a difference between the target pressure value previously calculated in the downstream position of the injector 35 and the presently calculated target pressure value (a feedforward correction flow rate calculating function), may add this feedforward correction flow rate to the above added value (=the hydrogen consumption+the cross leak amount+the P-term) and may multiply this added value by the above I-term to calculate the jet flow rate of the injector 35.

The feedforward correction flow rate in such a case is a fluctuation of a hydrogen gas flow rate due to the change of the target pressure value (a target pressure fluctuation correcting flow rate), and is updated for each calculation period of the control device 4 by use of, for example, a specific calculation formula indicating a relation between the difference of the target pressure value and the feedforward correction flow rate.

The cross leak amount is an amount of the hydrogen gas transmitted from a fuel gas flow path (an anode pole side) in the fuel cell 10 to an oxidizing gas flow path (a cathode pole side) through an electrolytic film, and is calculated based on the pressure value of the hydrogen gas in the downstream position of the injector 35 (the detected pressure value of the pressure sensor 43) (a cross leak amount calculating function: B6). Specifically, the cross leak amount is calculated using a specific map indicating a relation between the pressure value of the hydrogen gas in the downstream position of the injector 35 and the cross leak amount.

On the other hand, the control device 4 calculates a static flow rate on the upstream side of the injector 35 based on a gas condition on the upstream side of the injector 35 (the pressure of the hydrogen gas detected by the pressure sensor 41 and the temperature of the hydrogen gas detected by the temperature sensor 42) (a static flow rate calculating function: B8). In the present embodiment, the static flow rate is calculated and updated for each calculation period of the control device 4 by use of a specific calculation formula indicating a relation between the pressure and temperature of the hydrogen gas on the upstream side of the injector 35 and the static flow rate.

The control device 4 multiplies the driving period of the injector 35 by a value obtained by dividing the jet flow rate of the injector 35 by the static flow rate (a duty calculating function: B9) to calculate a basic jet time of the injector 35 (a basic jet time calculating function: B10), and the control device adds an invalid jet time described later to this basic jet time to calculate the total jet time of the injector 35 (a total jet time calculating function: B12).

This driving period is the period of a stepped (on/off) waveform indicating opening/closing states of the jet holes of the injector 35, and the driving period is set to a constant value by the control device 4 in the present embodiment.

The invalid jet time is a time required from a time when the injector 35 receives a control signal from the control device 4 to a time when the injector actually starts the jetting, and the invalid jet time is calculated and updated for each calculation period of the control device 4 by use of a specific map indicating a relation among the pressure of the hydrogen gas on the upstream side of the injector 35, the basic jet time of the injector 35 and the invalid jet time (an invalid jet time calculating function: B11).

Then, the control device 4 outputs the control signal for realizing the total jet time of the injector 35 calculated through the above procedure, to control a gas jet time and a gas jet timing of the injector 35, thereby regulating the flow rate and pressure of the hydrogen gas to be supplied to the fuel cell 10.

Moreover, the control device 4 performs feedback control of the injector 35 (the control of the gas jet time and the gas jet timing of the injector 35 for allowing the detected pressure value in the downstream position of the injector 35 to follow a predetermined target pressure value), and simultaneously performs purge control (the opening/closing control of the gas/water discharge valve 37), to discharge the water content and the hydrogen off-gas from the circulation flow path 32 to the outside through the gas/water discharge valve 37.

By this purge control, the control device 4 estimates the total amount of the hydrogen off-gas to be discharged from the opened gas/water discharge valve 37. Moreover, to estimate this amount, an estimated jet flow rate value Qinj of the injector 35 is used, and hence the control device 4 estimates, as the estimated jet flow rate value Qinj of the injector 35, a value obtained by subjecting the added value of the hydrogen consumption, the P-term and the cross leak amount to predetermined unit conversion (a jet flow rate estimating function: B21).

Moreover, in a case where the gas/water discharge valve 37 operated by this purge control is opened owing to, for example, foreign matters which bite into this discharge valve, even when the control is performed to close the opened gas/water discharge valve 37, the valve remains open and cannot be closed, and a so-called valve opening defect generated in this manner causes a problem that a fuel (the hydrogen gas) to be circulated through the fuel cell 10 is unnecessarily discharged, so that the control device 4 monitors the presence of the valve opening defect of the gas/water discharge valve 37 during the operation of the fuel cell 10.

Specifically, when the jet flow rate of the injector 35 calculated by the jet flow rate calculating function B7, that is, a gas supply command amount based on a PI control rule for the injector 35 is Qreq, the hydrogen consumption calculated by the fuel consumption calculating function B1, that is, the fuel gas consumption of the fuel cell 10 is Qfc and the cross leak amount from the anode pole side to the cathode pole side in the fuel cell 10 calculated by the cross leak amount calculating function B6 is Qcl, the valve opening defect of the gas/water discharge valve 37 is monitored based on an injector jet flow rate increase amount (a gas supply amount increase amount) Qinc calculated from an equation Qinc=Qreq−(Qfc+Qcl) by a jet flow rate increase amount calculating function B31.

The control device 4 judges that the valve opening defect is generated in the gas/water discharge valve 37 (detects the valve opening defect) in a case where a state in which this injector jet flow rate increase amount Qinc exceeds a predetermined first threshold value continues for a predetermined time, and the control device repeats opening/closing driving control (valve opening defect release control) for the gas/water discharge valve 37 a plurality of times, to return from a valve opening defect state to a normal state.

Next, the valve opening defect release control of the fuel cell system 1 will be described with reference to time charts of FIGS. 3 and 4.

Figure 3:
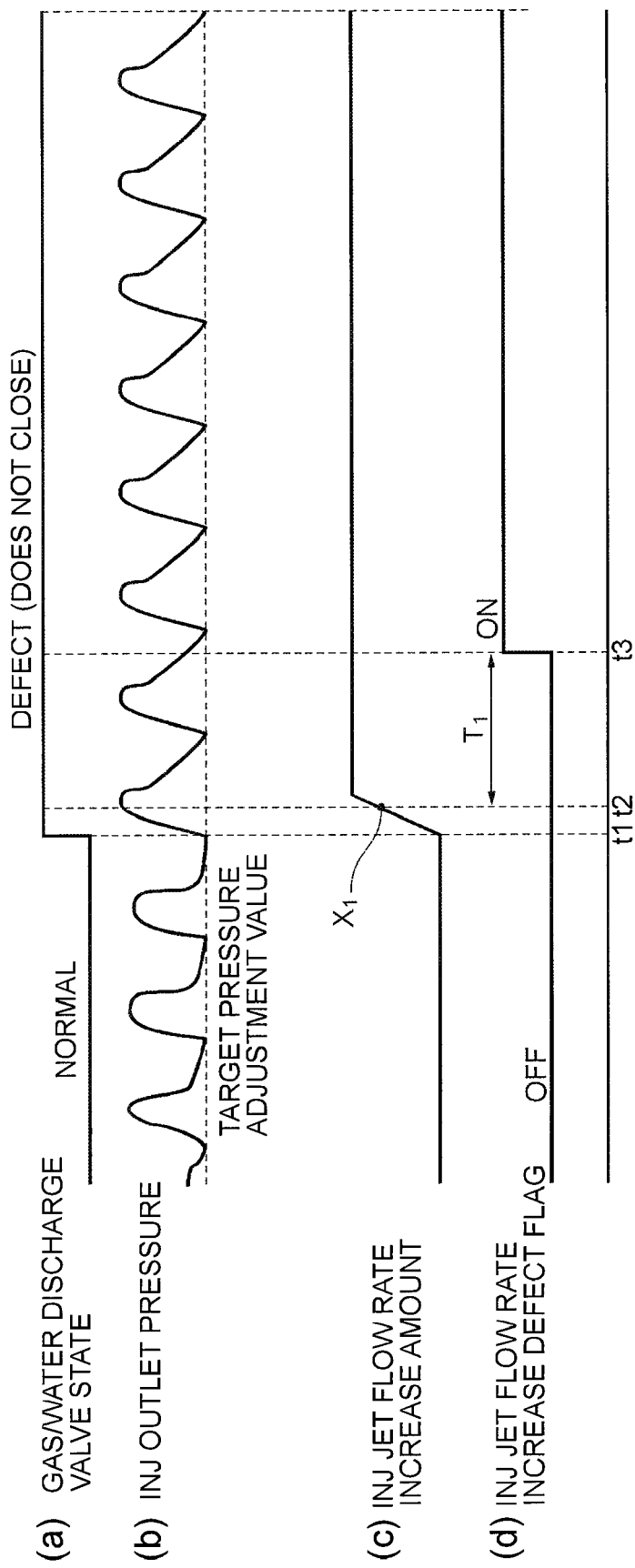
FIG. 3 is a time chart for explaining valve opening defect release control of the fuel cell system shown in FIG. 1.

In the time chart of FIG. 3, (a) shows a normal state and a defect state (the valve opening defect) of the gas/water discharge valve 37, (b) shows an outlet pressure of the injector 35 detected by the secondary pressure sensor 43, (c) shows the increase amount of the injector jet flow rate calculated by the jet flow rate increase amount calculating function B31 and (d) shows an injector jet flow rate increase defect flag indicating that an increase defect is generated in the injector jet flow rate, that is, the valve opening defect is generated in the gas/water discharge valve 37, respectively.

Figure 4:
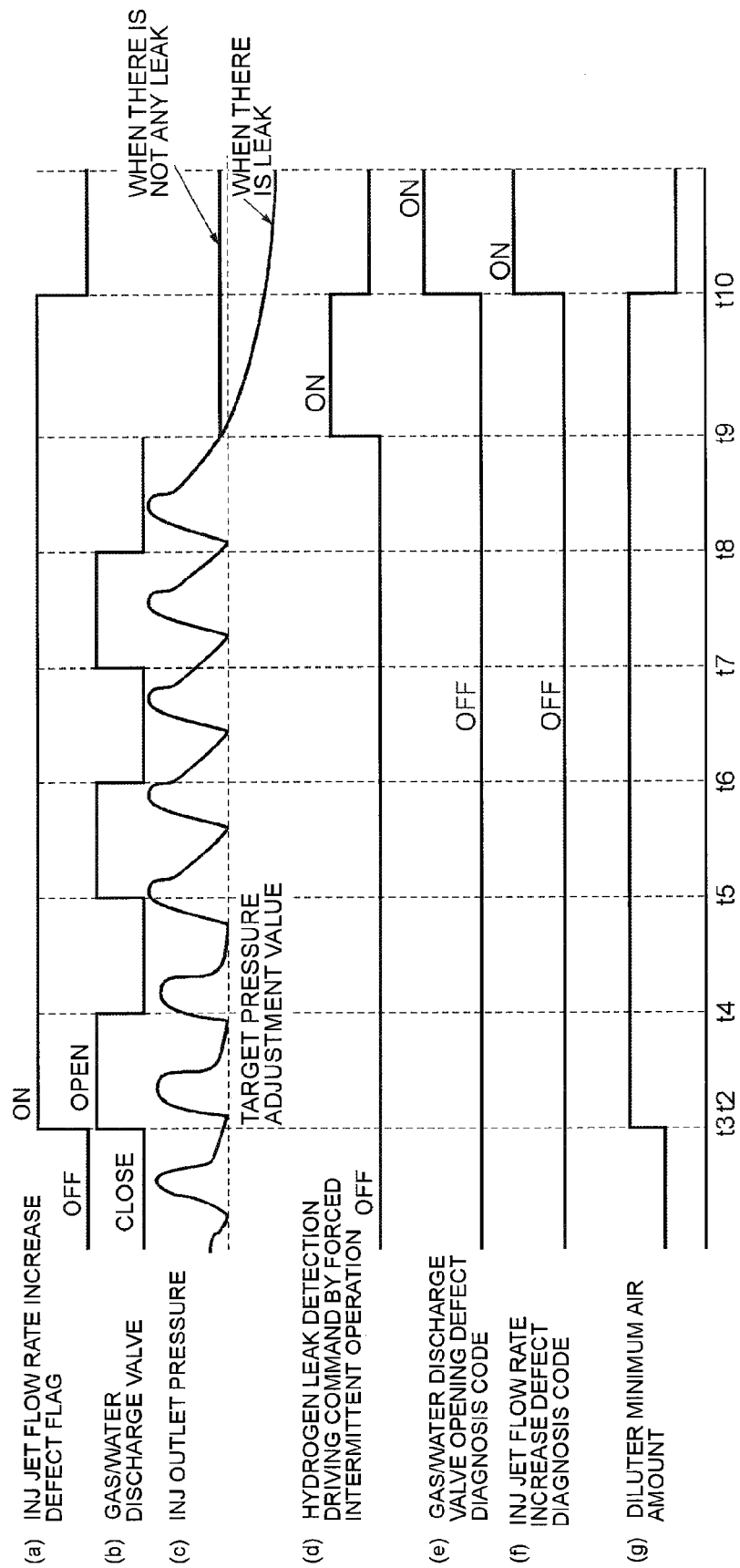
FIG. 4 is a time chart for explaining valve opening defect stop control in the fuel cell system shown in FIG. 1.

Moreover, in the time chart of FIG. 4, (a) shows the injector jet flow rate increase defect flag in the same manner as in FIG. 3(*d*), (b) shows an opening/closing command to the gas/water discharge valve 37 by the control device 4, (c) shows the outlet pressure of the injector 35 detected by the secondary pressure sensor 43 in the same manner as in FIG. 3(*b*), (d) shows a driving command of hydrogen leak detection by a forced intermittent operation, (e) shows a diagnosis code indicating that the valve opening defect is generated in the gas/water discharge valve 37, (f) shows a diagnosis code indicating that the increase defect is generated in the injector jet flow rate and (g) shows the minimum oxidizing off-gas amount in the diluter 40 controlled by the driving of the compressor 24 by the control device 4 (the minimum air amount of the diluter), respectively.

The control device 4 performs usual purge control from a time when the valve opening defect is generated in the gas/water discharge valve 37 (time t1) to a time when the valve opening defect release control is started (time t3). The control device 4 controls the opening of the gas/water discharge valve 37 by the usual purge control. In other words, the control device turns on a valve opening command to the gas/water discharge valve 37. Further in other words, the control device issues a command for supplying, to the solenoid, an opened valve holding current capable of holding an opened valve state in which the valve body is detached from the valve seat by the electromagnetic driving force obtained by the energization of the solenoid, and the device controls the opening of the gas/water discharge valve 37 after an elapse of predetermined time. In other words, the control device turns off the valve opening command to the gas/water discharge valve 37. Further in other words, in a case where the control device issues a command for blocking the energization of the solenoid or a command for supplying, to the solenoid, a current which cannot hold the detached state of the valve body from the valve seat by the electromagnetic driving force and the foreign matters bite into the gas/water discharge valve 37 to generate the valve opening defect that the opened gas/water discharge valve 37 remains opened and cannot be closed even under closing valve control, the injector jet flow rate increase amount Qinc calculated by the jet flow rate increase amount calculating function B31 continues to rise as shown in FIG. 3(*c*).

At this time, the control device 4 monitors the injector jet flow rate increase amount Qinc, and in a case where the valve opening defect is generated in the gas/water discharge valve 37 and the injector jet flow rate increase amount Qinc exceeds a predetermined detection threshold value (the first threshold value) which cannot be generated at a normal time (time t2), the control device waits for the elapse of a predetermined standby time T1 (the time t3). Then, the control device 4 judges that the increase defect is generated in the jet flow rate of the injector 35, in a case of the elapse of the standby time T1 after the injector jet flow rate increase amount Qinc exceeds the detection threshold value X1, and the control device sets the injector jet flow rate increase defect shown in FIG. 3(d) to "ON" from "OFF".

When "ON" is set to the injector jet flow rate increase defect flag, the control device 4 judges that the valve opening defect is generated in the gas/water discharge valve 37 (time t3), and performs opening/closing driving control for releasing the valve opening defect. Hereinafter, this opening/closing driving control will be described with reference to the time chart of FIG. 4. It is to be noted that in FIG. 4, the same part as that of the time chart of FIG. 3 is denoted with the same symbols.

On detecting the valve opening defect of the gas/water discharge valve 37, the control device 4 repeats the opening/closing driving control of the gas/water discharge valve 37 the predetermined number of times, specifically three times, to release the valve opening defect of the gas/water discharge valve 37 shown in FIG. 4(b).

That is, the control device turns on the valve opening command to control the opening of the gas/water discharge valve 37 (the time t3), subsequently turns off the valve opening command to control the closing of the gas/water discharge valve 37 (time t4), then turns on the valve opening command to the gas/water discharge valve 37 again (time t5), subsequently turns off the valve opening command to the gas/water discharge valve 37 (time t6), turns on the valve opening command to the gas/water discharge valve 37 again (time t7), and then turns off the valve opening command to the gas/water discharge valve 37 (time t8). By the opening/closing driving control for releasing this valve opening defect, the gas/water discharge valve 37 is subjected to ON/OFF control for a predetermined driving period (e.g., the ON/OFF control at an interval of one second).

Afterward, as shown in FIG. 4(d), the control device 4 issues signal "ON" as a hydrogen leak detection driving command by a forced intermittent operation (time t9), and closes the injector 35 and the gas/water discharge valve 37. In consequence, a closed space is formed in the hydrogen supply flow path 31 and the circulation flow path 32 extending from the injector 35 to the gas/water discharge valve 37 and including a gas flow path in the fuel cell 10, so that the control device 4 monitors the pressure change (or a change ratio) in this closed space by the secondary pressure sensor 43.

That is, since the valve opening defect of the gas/water discharge valve 37 might be one cause for the hydrogen leak from the closed space, the control device 4 judges that the valve opening defect of the gas/water discharge valve 37 cannot be released even by the opening/closing driving control in a case where the outlet pressure of the injector 35 shown in FIG. 4(c) lowers with an elapse of time, and as shown in FIG. 4(e), the control device rewrites the valve opening defect diagnosis code of the gas/water discharge valve 37 from "OFF" indicating that there is not any history of the valve opening defect to "ON" indicating the history (time t10).

In such a case, simultaneously with this rewriting (the time t10), as shown in FIG. 4(g), the driving of the compressor 24 is stopped to set the minimum oxidizing off-gas amount in the diluter 40 to "0", thereby completely stopping the operation of the fuel cell 10. Moreover, the injector jet flow rate increase defect flag is reset from "ON" to "OFF".

On the other hand, in a case where the outlet pressure of the injector 35 shown in FIG. 4(c) does not change or hardly changes even with the elapse of predetermined time, the control device 4 judges that the valve opening defect of the gas/water discharge valve 37 is released by the opening/closing driving control shown in FIG. 4(b). However, since the generation of the increase defect of the jet flow rate in the injector 35 due to a certain cause can be confirmed later, as shown in FIG. 4(f), the jet flow rate increase defect diagnosis code of the injector 35 is rewritten from "OFF" indicating that there is not any history of the increase defect of the jet flow rate in the injector 35 to "ON" indicating the history (the time t10).

According to the fuel cell system 1 of the above present embodiment, even in the case of the generation of the valve opening defect that the gas/water discharge valve 37 remains opened and cannot be closed owing to, for example, foreign matters which bite into the valve, the control device 4 monitors the valve opening defect based on the injector jet flow rate increase amount Qinc calculated for a predetermined control period, so that the valve opening defect of the gas/water discharge valve 37 can be detected without any delay during the operation.

Then, in a case where the valve opening defect is generated in the gas/water discharge valve 37, the valve opening defect release control of the gas/water discharge valve 37 is performed by repeating the opening/closing driving control the plurality of times to eliminate the valve opening defect of this gas/water discharge valve 37. Therefore, when the valve opening defect is released by this control, the operation of the fuel cell system 1 can be continued without stopping the operation against user's intention.

Moreover, when the valve opening defect diagnosis code of the gas/water discharge valve 37 or the jet flow rate increase defect diagnosis code of the injector 35 is "ON" and then this diagnosis code is read from the control device 4 during maintenance or the like, it is possible to confirm the history of a cause such as the valve opening defect causing the jet flow rate increase defect of the injector 35 or another factor causing the jet flow rate increase defect of the injector 35, so that the gas/water discharge valve 37 can quickly be changed or repaired.

It is to be noted that in the above embodiment, as an example, there has been described a case where the valve opening defect is generated in the gas/water discharge valve 37, and to eliminate this valve opening defect of the gas/water discharge valve 37, the valve opening defect release control is performed by repeating the opening/closing driving control of the gas/water discharge valve 37 the plurality of times, followed by performing valve opening defect stop control. However, after the generation of the valve opening defect of the gas/water discharge valve 37, opening/closing defect stop control may be performed instead of the valve opening defect release control.

Moreover, in the above embodiment, an example has been described in which the gas/water discharge valve 37 for realizing both the gas discharge and the water discharge is provided in the circulation flow path 32, but a water discharge valve for discharging the water content collected by the gas-liquid separator 36 to the outside, and a gas discharge valve for discharging the gas in the circulation flow path 32 to the outside may separately be provided, and the gas discharge valve may be controlled by the control device 4.

The invention claimed is:
1. A fuel cell system comprising:
fuel cells;
a supply flow path for supplying a fuel gas from a fuel supply source to the fuel cells;
a variable gas supply device that regulates a gas condition of the supply flow path;

a first control device that drives and controls the variable gas supply device;

an off-gas flow path configured to release a fuel off-gas from the fuel cells to the outside through a discharge valve;

a second control device that drives and controls the discharge valve; and a defect detection device that detects a valve opening defect of the discharge valve, wherein the defect detection device detects the valve opening defect of the discharge valve based on a gas supply amount increase amount $Qinc=Qreq-(Qfc+Qcl)$, in which Qreq is the gas supply command amount based on a PI control rule for the variable gas supply device, Qfc is a fuel gas consumption in the fuel cells, and Qcl is a cross leak amount from an anode pole side to a cathode pole side in the fuel cells.

2. The fuel cell system according to claim 1, wherein the defect detection device detects the valve opening defect of the discharge valve in a case where a state in which the gas supply amount increase amount Qinc exceeds a predetermined first threshold value continues for a predetermined time.

3. The fuel cell system according to claim 1, wherein the second control device repeats opening/closing driving control for the discharge valve a plurality of times, when the defect detection device detects the valve opening defect of the discharge valve.

4. The fuel cell system according to claim 1, wherein the variable gas supply device is an electromagnetic driving type opening/closing valve in which a valve body is directly driven with an electromagnetic driving force for a predetermined driving period and detached from a valve seat.

5. The fuel cell system according to claim 1, wherein the discharge valve is an electromagnetic driving type opening/closing valve in which a valve body is directly driven with an electromagnetic driving force for the predetermined driving period and detached from the valve seat.

* * * * *